July 30, 1968

C. M. RADER 3,395,345

METHOD AND MEANS FOR DETECTING THE PERIOD OF
A COMPLEX ELECTRICAL SIGNAL

Filed Sept. 21, 1965

INVENTOR
CHARLES M. RADER
BY Robert T. Dunn
ATTORNEY

July 30, 1968
C. M. RADER
3,395,345
METHOD AND MEANS FOR DETECTING THE PERIOD OF
A COMPLEX ELECTRICAL SIGNAL
Filed Sept. 21, 1965
2 Sheets-Sheet 2
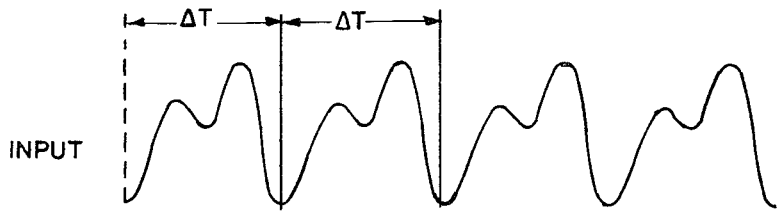
FIG. 3
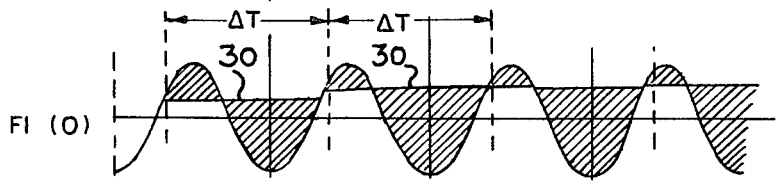
FIG. 4
FIG. 5
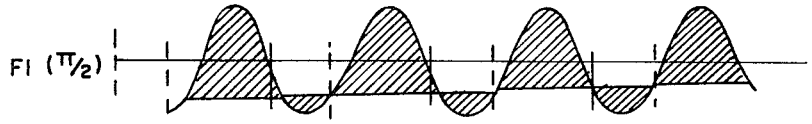
FIG. 6
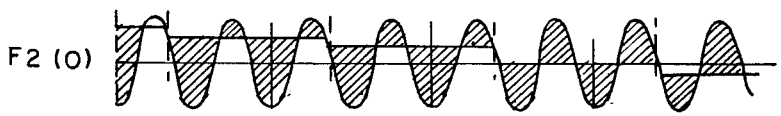
FIG. 7
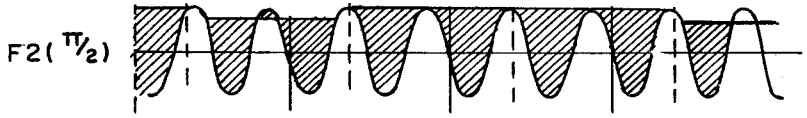
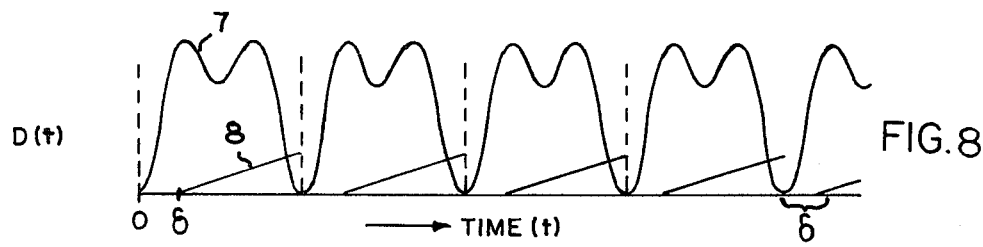
FIG. 8
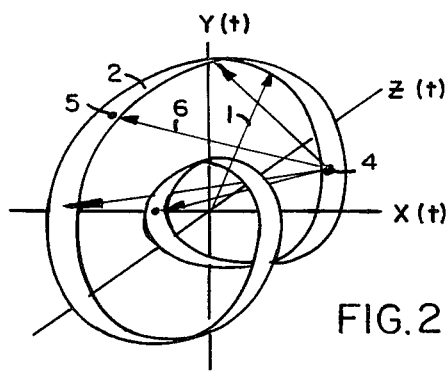
FIG. 2
INVENTOR
CHARLES M. RADER
BY,
Robert T Dunn
ATTORNEY

# United States Patent Office 3,395,345
Patented July 30, 1968

3,395,345
METHOD AND MEANS FOR DETECTING THE PERIOD OF A COMPLEX ELECTRICAL SIGNAL
Charles M. Rader, Concord, Mass., assignor to Massachusetts Institute of Technology, a corporation of Massachusetts
Filed Sept. 21, 1965, Ser. No. 488,963
12 Claims. (Cl. 324—77)

ABSTRACT OF THE DISCLOSURE

The period of a complex electrical signal representing for example the human voice is detected by sampling each of a plurality of different frequency components of the signal at a selected instant of time, then comparing these values over at least one period of the signal with the subsequent values of the corresponding frequency components to produce signals representing the difference therebetween. Then the difference signals are combined and the periodicity of the combined signal is detected. The periodicity of the combined signal is indicative of the period of the complex input signal.

---

This invention relates to devices for detecting periodicity, and more particularly to methods and means for detecting the pitch of a sound pattern, such as produced by the human voice.

Pitch detectors for detecting the pitch of a complex waveform have in the past incorporated a number of different principles of operation. Some of these are the following: filtering and tracking to emphasize the fundamental spectral line; examining the spectrum for periodicities; examining a short time autocorrelation function to find peaks; comparing faveform peaks with previous peaks; and the nonlinear distortion of the waveform to recover a missing fundamental. These prior systems suffer from various disadvantages. For example, some will not work if the fundamental frequency of the complex waveform is absent. Others require complex, and therefore, elaborate and expensive circuits, and all are unreliable from time to time, particularly when employed to detect the pitch of human speech which extends over a considerable range.

Heretofore, speech pitch detection has been accomplished by measuring a moving vector representative of a portion or component of the complex speech waveform. One approach to this is described in a report entitled "A Method of Speech Compression," by Robert Lerner of Massachusetts Institute of Technology, Lincoln Laboratory, dated Aug. 24, 1959, relating to work performed under U.S. Air Force Contract AF19(604)–5200. As described in the report, the complex speech waveform is viewed as the real axis projection of a vector which moves about in a complex signal plane as a function of time relative to the origin of the axis. The real and imaginary parts of this vector are obtained by passing the complex waveforms through 90° phase splitting network and empolying the two quadrature components to energize the deflection controls of an oscilloscope. The oscilloscope exhibits the distance of a moving vector from the origin, the vector being composed of the two components. The length of the moving vector is an easier waveform to pitch detect on than the complex waveform. However, the minima or maxima of this moving vector waveform which reveal the pitch periods are often obscure and not sharply defined.

An application of the above prior technique for instantaneously measuring the pitch rate so as to produce a pulse rate representative thereof includes electrical circuits for adding the squares of the quadrature components to give the square of the magnitude of the moving vector and then attempting to peak ride the summation to detect minimum amplitudes of the moving vector. This technique has some drawbacks, the most significant drawbacks being that the system will not operate properly if only the fundamental is present in the complex waveform which is measured. In addition, as mentioned above, the minima are obscure.

It is an object of the present invention to provide methods and means for detecting the pitch of a periodic complex waveform which avoids some of the above mentioned disadvantages of prior systems.

It is another object of the present invention to provide methods and means for detecting pitch of a periodic complex waveform, whereby pitch detection can be accomplished when only the fundamental of the complex waveform is present.

It is another object to provide a simple system for measuring the period of any substantially periodic waveform.

It is another object to provide such pitch-detecting means employing relatively simple circuit elements which are permitted a relatively wide latitude of inaccuracy without substantially deteriorating the effectiveness of the system to accurately detect the pitch of the complex waveform.

It is another object of the present invention to provide a pitch-detecting system which need not measure the frequently obscure maxima or minima magnitudes of the moving vector such as encountered in the prior systems.

In accordance with principal features of the present invention, the complex periodic input waveform is passed through a multitude of N bandpass filters each centered at progressively increasing frequencies. The output of each filter is split in phase, producing two components which are substantially in quadrature relationship, the total number of such components produced being 2N. In operation, each of the 2N components are simultaneously sampled and held, and the sampled values are compared with instantaneous values, producing a difference component for each. The difference components are then squared and added to produce a summation signal. Minima of the summation signal are detected to produce a pulse rate representative of the pitch rate of the input waveform and these same pulses establish the instant at which the 2N components are sampled and held for the comparison. The moving vector traces a closed curve in 2N space and the time for the complete trace of the curve is the period of the input waveform. By sampling the magnitude of each of the components which defined the moving vector at any arbitrary point along the trace of the moving vector, and thereafter computing the difference for each of the components between the instantaneous value of each component and the value of the component at the arbitrary selected instant, 2N signals are obtained which represent the chord of the trace from the point on the trace at the selected instant to any subsequent instant. When this chord length returns to zero, then it is concluded that the pitch cycle has been completed. Thus, the magnitude of the moving vector from the origin is not measured and the accompanying difficulty of measuring the minima of this vector are not encountered.

Other features and objects of the present invention will be apparent from the following description taken in conjunction with the figures, in which:

FIGURE 2 is a pictorial aid illustrating a vector moving in 3-dimensional space to illustrate advantages of features of the present invention;

FIGURES 3 to 8 illustrate waveforms which might occur at various points throughout the system illustrated in FIGURE 1 operating to detect the pitch of a typical complex input waveform such as a periodic speech waveform.

Figure 1:
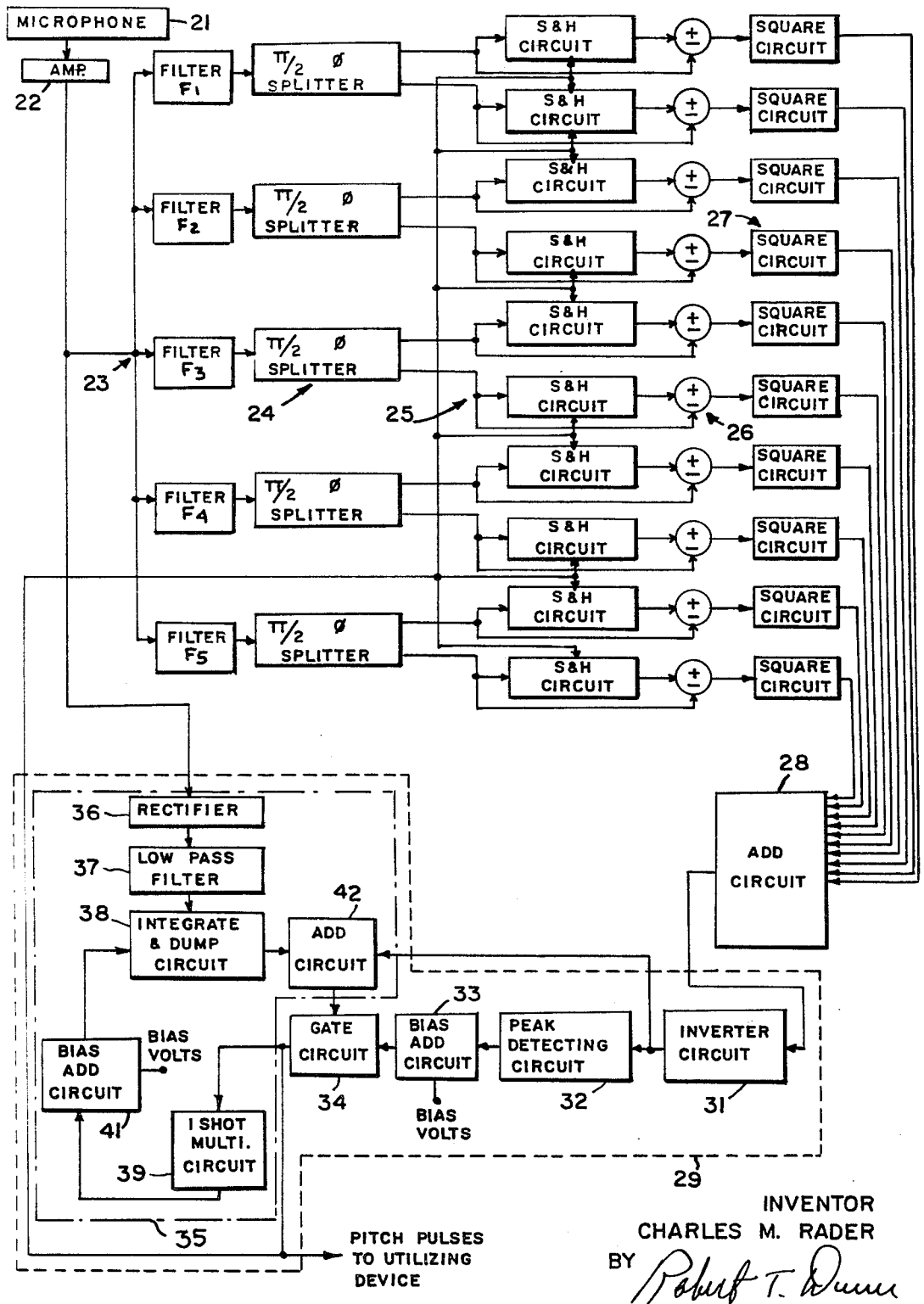
FIGURE 1 is a block diagram of an electrical system for detecting the vector pitch of a complex waveform.

Turning first to FIGURE 2, there is shown the trace of a complex vector in 3 dimensions, noted X, Y, and Z, as a function of time. The complex vector 1 traces out a path in the 3 dimensions represented by the ribbon 2. Ambiguities arise as to when the trace swings near the origin and commences a new pitch cycle. In FIGURE 2, the trace is shown as commencing near the origin and returning to points near the origin one pitch-cycle later. Thereafter, the trace continues on the next cycle along substantially the same path. In accordance with principal features of the present invention, no effort is made to determine exactly when the trace returns near the origin. Instead, at some arbitrary initial instant represented by the point 4 on the trace, an instantaneous measure of components of the moving vector 1 is made and recorded by, for example, sample and hold circuits. Thereafter, all components of the vector 1 are compared with the same components at the instant of time denoted by the point to yield a moving vector which is a chord of the trace. For example, at the instant of time denoted by point 5 on the trace, the difference vector is represented by the chord vector 6. Thus, at the end of the cycle following the instant of time denoted by point 4, the chord vector such as 6 determined in this manner will be zero.

In application of the above principle, the several dimensions such as represented by the three dimensions, X, Y, and Z, are preferably more numerous than 3. For example, where N bandpass filters are employed, each centered at a different frequency and the output of each is split into phase quadrature components, then the moving vector is described by 2N components and must be represented as such in space of 2N dimensions. Three dimensions have been chosen for the illustration in FIGURE 2, because to demonstrate more than three dimensions is excessively difficult. In practice, if several of the bandpass filters contained significant energy, then the trace or curve is unlikely to intersect itself during the interval of one pitch cycle. If the trace does intercept itself during the interval of one pitch cycle, then a measurement of the chord will result in error only in the very unlikely event that the initiating or starting point, represented by point 4, is in fact the point of intersection.

In view of the foregoing, it becomes more evident that by the performance of relatively simple steps, the pitch rate of the complex waveform can be detected. These fundamental steps are the following: first, save a point on the trace, such as trace 2 of the moving complex vector and hold components of the point saved, one for each of the 2N components; second, find the distance between the moving or time-varying vector and the save point; and third, detect when the distance comes closest to zero, signifying the end of a pitch period.

The complex waveform represented by the vector 1, FIG. 2, since the vector repeats exactly the same trace each pitch cycle, is an ideal case and is perfectly periodic. However, in many cases the complex waveform is not perfectly periodic, and so the distance between the moving vector and saved point will probably not return exactly to zero at the end of a pitch cycle, but will almost certainly have a local minimum at the time corresponding to the termination of the pitch cycle, and this minimum will come closer to zero than any other value of the distance during the interval of the elapsed pitched period.

The occurrence of the minimum at the elapsed period mentioned above is illustrated by the waveforms in FIGURES 3 to 8, which show the treatment of some of the components of a complex speech waveform in accordance with the features of the invention. FIGURE 3 illustrates a typical periodic waveform representing human speech which is obviously repetitive in nature. The period of repetition, as shown, is $\nabla T$. If this waveform is filtered to produce a component at frequency $F_1$ and another component at frequency $F_2$, which for convenience is a harmonic of $F_1$, then waveforms such as illustrated in FIGURES 4 and 6 might be obtained. Thereafter, $F_1$ and $F_2$ are each phase split into quadrature components, thus producing waveforms $F_2(0)$ and $F_2(\pi/2)$ and the waveforms $F_2(0)$ and $F_2(\pi/2)$ in FIGURES 4 to 7. Then, at any arbitrary selected point of time, such as time zero, the magnitude of each of these waveforms is saved by, for example, a sample and hold circuit, and thereafter the magnitude of each is compared with its corresponding saved value to produce a difference magnitude. The difference magnitude of each waveform is represented by the shaded portions of the waveform. Upon squaring the difference magnitudes and adding the squared values together, the periodic summation waveform representing $D(t)$, as illustrated in FIGURE 8, is obtained.

The summation waveform 7, shown in FIGURE 8, represents the value $D(t)$ for the four components illustrated. The periods of this waveform are identified as $\Delta T$ and as shown occur at the extreme negative-going peaks of the summation waveform, which, in the example, peak to the zero level. When, however, the waveform is not perfectly periodic, these peaks will not return exactly to zero and so some simple technique must be devised for detecting the peaks to ascertain the end of each pitch period. This may be accomplished by, for example, integrating the input speech waveform after a slight delay $\delta$ following the initial arbitrarily selected instant and then noting when the integrated value exceeds $D(t)$. Suitable circuits are provided for producing pulses when this occurs and these pulses represent the termination of each pitch period and together represent the pitch rate. The interated waveform is denoted 8 in FIGURE 8.

Turning next to FIGURE 1, there is shown a block diagram of circuit elements for producing pulses at a rate representative of the pitch rate of a complex waveform, such as produced by the human voice. The equipment includes a microphone 21, responding to voice sound. The output of the microphone is amplified by a suitable amplifier 22 and fed to a bank of filters 23, including for example, five filters for separating frequency components $F_1$ to $F_5$ of the complex waveform. Thus, in this example, N is 5.

The output of each filter is fed to a phase splitter, which preferably splits the filter output into quadrature components. While it is preferred the components be exactly in quadrature, this is not absolutely required and they may be split into other phase components instead. Thus, there are produced at the output of the phase splitters the 2N vector wave components of the original input complex speech waveform. Each of these 2N components are fed to a separate sample and hold circuit form a bank 25 of sample and hold circuits and each output is compared with the corresponding held value in one of the bank 26 of comparing circuits. The comparing circuits are, for example, simple differential amplifiers. Thus, the output of the 2N compare circuits represents the chord vector illustrated in FIGURE 2 and discussed above with reference thereto. Each of these components is squared in one of a bank 27 of squaring circuits, producing 2N components which make up the squared chord vector $D(t)$ discussed above, with reference to FIGURE 8. These components are added in add circuit 28 to produce the squared chord vector $D(t)$.

Here, the squared chord is obtained rather than the chord, as described above with reference to FIGURE 2, because the squared chord is easier to obtain with the circuitry described and serves just as well. The squared chord peaks at the same instants of time as the chord and in the same direction and diminishes to zero or closest to zero at the same instants of time as the chord. Accordingly, it is not necessary to take the square root of the squared chord and examine it for periodicity; the squared chord can be examined instead.

The time-varying squared chord $D(t)$ is examined for periodicity by the circuit 29 which produces pulses at the pitch rate of the complex periodic waveform. These pulses are fed to utilizing circuits and also control the sample and hold circuits in bank 25. In this respect, the pulses clear the sample and hold circuits and initiate sampling of the 2N time-varying components at the instant of each pulse. Thus, upon the occurrence of each pitch pulse, a new value of each of the 2N components is sampled and held or stored by the sample and hold circuits for the duration of a pitch period. These held values for the components of $F_1$ and $F_2$, shown in FIGURES 4 to 7, are represented by the heavy horizontal lines, such as line 30 in FIGURE 4. The held values shift slightly at the end of each pitch cycle following time zero due to intrinsic delays in the circuits.

The circuit 29 includes, for example, an inverter circuit 31 for inverting the waveform $D(t)$ in the output of add circuit 28 so that the negative going peaks in the waveform which define pitch intervals become positive. These positive peaks are then detected by peak detecting circuit 32 which produces a sharp pulse at each peak. The base voltage of these pulses is changed to a bias voltage in bias add circuit 33 producing clamped pulses which are fed to gate circuit 34. The gate circuit is controlled so that it opens and feeds the sharp pulses to a utilizing system when the integrated value of the periodic speech waveform from the microphone 21 exceeds the magnitude of $D(t)$. This occurs at each of the intervals $\Delta T$ shown in FIGURE 8 commencing when the integrated curve 8 crosses the waveform $D(t)$ denoted 7. The gate remains open for an interval $\delta$ following this crossing, after which the cycle repeats.

The gate control circuits 35 include a rectifier 36 and low pass filter 37 coupled to the output of amplifier 22 for feeding the significant components of the periodic speech waveform to integrate and dump circuit 38. These components are integrated commencing with the trailing edge of a pulse generated by one shot multi-vibrator circuit 39 in response to the sharp pulses from the gate 34. The period of the multi-vibrator is $\delta$. Thus, the multi-vibrator produces pulses of duration $\delta$ each of which commences when the integrated value of the periodic input speech waveform exceeds waveform $D(t)$.

The multi-vibrator pulses are suitably clamped by the bias add circuit 41 and control, for example, a switch for short circuiting an integrating capacitance in the integrate and dump circuit. The bias is provided to insure that the integrating capacitance is not short circuited during absence of the multi-vibration pulses.

The comparison of the integrated input speech waveform and $D(t)$ is accomplished by add circuit 42. This circuit adds the integrated value which is a positive voltage to the inverted $D(t)$ which is a negative voltage, producing a positive voltage level output when the former is greater. The output controls the gate circuit 34 so that the gate opens and feeds pulses representative of pitch rate to a utilization device and to the sample and hold circuits in bank 25 when the output voltage level is positive.

The circuits 29 described above, for determining the periodicity of the chord of the trace of the moving vector illustrate but one technique for determining such periodicity. Other circuits could be substituted without deviating from the scope of the invention. In fact, any of the known techniques mentioned herein could be employed in whole or in part to determine the periodicity of the chord. The focal point of the present invention is concerned with the concept of employing the chord of the trace of the moving vector rather than the moving vector itself, to produce a waveform exhibiting more sharply defined periodicity than the input waveform.

The methods and means described in embodiments herein for examining a complex periodic input waveform to determine periodicity include the steps of saving a point on the trace of the moving vector which represents the input waveform and, then, comparing subsequent points on the same trace with the saved point to obtain the time-varying chord and, finally, detecting periodicity in the time-varying chord. The specific embodiments described herein and details relating thereto are made only by way of example and do not limit the spirit and scope of the invention as set forth in the accompanying claims.

What is claimed is:

1. Means for determining the period of a complex signal comprising means for producing said complex signal, means responsive to said signal for producing a plurality of different frequency components thereof, means for sampling the value of each of said components at a selected instant of time, means for comparing over at least a period of said complex signal said sampled values with the instantaneous values of the corresponding frequency component to produce signals representative of the difference therebetween, means for combining said signals representative of the difference to produce a combined signal and means for detecting the periodicity of said combined signal to produce signals representative of the period of said periodic signal.

2. Means for determining the period of a complex signal comprising means for producing said complex signal, means responsive to said signal for producing a plurality of different frequency components thereof, means for sampling the value of each of said components at a selected instant of time, means for comparing over at least a period of said complex signal said sampled values with the instantaneous values of the corresponding frequency component to produce signals representative of the difference therebetween, means for combining the absolute values of said signals representative of the difference to produce a combined signal, and means for detecting the periodicity of said combined signal to produce signals representative of the period of said periodic signal.

3. Means for determining the period of a complex input signal comprising means for producing said complex signal, means responsive to said input signal for producing a plurality of different frequency components thereof, means for sampling the values of said components at a selected instant of time, means for comparing over at least a period of said complex signal said sampled values with the instantaneous values of the corresponding frequency component to produce signals representative of the difference therebetween, means for rectifying said difference signals, means for combining said rectified difference signals to produce a combined signal, and means for detecting the periodicity of said combined signal to produce signals representative of the period of said periodic input signal.

4. Means for determining the period of a complex input signal comprising means for producing said complex signal means responsive to said input signal for producing a plurality of N different frequency components thereof, means for splitting the phase of each of said N components producing 2N components, means for sampling the magnitude of each of said 2N components at a selected instant of time, means for comparing over at least a period of said complex signal said sampled magnitudes with the instantaneous magnitudes of the corresponding phase component producing signals representative of the difference therebetween, means for squaring said difference signals, means for combining said squared difference signals to produce a combined signal, and means for detecting the periodicity of said combined signal to produce signals representative of the period of said periodic input signal.

5. A system for determining the period of a complex, time-varying electric input signal, which can be represented mathematically by a moving vector whose coordinates define a trace in multi-dimensional space comprising, electrical means responsive to said input signal for producing a system output signal which represents the magnitudes of chords of said trace, all passing through the same selected point on said trace, and electrical means responsive to said system output signal for detecting the period thereof.

6. A system as in claim 5 and in which said electrical means for producing said output signal comprises, electrical means responsive to said input signal for producing a plurality of time-varying signals derived from said input signal and each having the same periodicity as said input signal, each of said derived signals representing mathematical coordinates of a moving vector defining a trace in multidimensional space, means responsive to each of said multitude of derived signals for producing a multitude of time-varying derived output signals, each of which represents the magnitudes of chords of one of said traces passing through a selected point on said trace, and means for combining said multitude of derived output signals to produce said system output signal.

7. A system as in claim 6, and in which, said multitude of derived output signals are produced by means including, means for sampling the magnitude of each of said time-varying derived signals at a given instant of time, means for comparing each of said sampled magnitudes with the instantaneous magnitude of the corresponding time-varying derived signal to produce each of said multitude of derived output signals representative of the difference therebetween.

8. A system as in claim 7 and in which, said means for comparing further includes, means for continually detecting the algebraic magnitude difference between each of said derived signals and said sampled magnitude of the same derived signal to produce a multitude of time-varying derived difference signals, and means for squaring each of said time-varying derived difference signals to produce said multitude of derived output signals.

9. A method for determining the period of a complex input signal comprising the steps of producing from said signal a multitude of different components thereof, each of which is defined mathematically by a repeated trace in multi-dimensional space, producing signals representative of chords of each of said traces which pass through simultaneous points on said traces, combining said signals representative of said chords to produce a combined signal and detecting the period of said combined signal.

10. A method for determining the period of a complex input signal comprising the steps of producing from said signal a multitude of components thereof, sampling the value of each of said components at a predetermined instant, comparing said sampled values with the instantaneous values of the corresponding component to produce signals representative of the difference therebetween, combining said signals representative of the difference to produce a combined signal and detecting the period of said combined signal.

11. A method for determining the period of a complex periodic input signal comprising the steps of producing from said signal a multitude of different frequency components thereof, producing from each of said frequency components, components of different phase, sampling the value of each of said phase components at a predetermined instant, comparing each of said sampled values with the instantaneous values of the corresponding phase component to produce signals representative of the difference therebetween, combining said signals representative of the differences to produce a combined signal and detecting the period of said combined signal.

12. A method for determining the period of a complex periodic signal comprising the steps of producing from said signal a multitude of different frequency components thereof producing from each of said frequency components, components in phase quadrature, sampling the value of each of said quadrature components at a predetermined instant, comparing each of said sampled values with the instantaneous values of the corresponding quadrature components to produce signals representative of the difference therebetween, combining said signals representative of the differences to produce a combined signal and detecting the period of said combined signal.

References Cited

UNITED STATES PATENTS

| | | | |
|---|---|---|---|
| 2,159,790 | 5/1939 | Freystadt et al. | 324—77 |
| 3,009,106 | 11/1961 | Haase | 179—1 X |
| 3,020,344 | 2/1962 | Prestigiacomo | 324—77 X |
| 3,217,251 | 11/1965 | Andrew | 179—1 X |

RUDOLPH V. ROLINEC, *Primary Examiner.*

P. WILLIE, *Assistant Examiner.*